United States Patent
Schultz et al.

(10) Patent No.: US 9,325,939 B2
(45) Date of Patent: Apr. 26, 2016

(54) METHOD AND SYSTEM FOR PROVIDING GAZE-DIRECTED CORRECTION DURING A VIDEO CONFERENCING SESSION

(71) Applicant: Verizon Patent and Licensing Inc., Arlington, VA (US)

(72) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/460,002

(22) Filed: Aug. 14, 2014

(65) Prior Publication Data

US 2016/0050391 A1   Feb. 18, 2016

(51) Int. Cl.
*H04N 7/14* (2006.01)
*H04N 7/15* (2006.01)
*H04L 29/06* (2006.01)
*G06K 9/00* (2006.01)

(52) U.S. Cl.
CPC ............ *H04N 7/144* (2013.01); *G06K 9/00597* (2013.01); *H04L 65/1083* (2013.01); *H04L 65/601* (2013.01); *H04N 7/15* (2013.01)

(58) Field of Classification Search
CPC ........................................................ H04N 7/14
USPC ...................... 348/14.01, 14.16, 14.07, 14.12
See application file for complete search history.

(56) References Cited

U.S. PATENT DOCUMENTS

| 8,384,760 | B2 * | 2/2013 | Tan | ......... | H04N 7/144 348/14.01 |
| 8,908,008 | B2 * | 12/2014 | Tan | ......... | 348/14.01 |
| 2015/0373303 | A1 * | 12/2015 | Visosky | ......... | H04N 7/15 348/14.05 |

* cited by examiner

*Primary Examiner* — Olisa Anwah

(57) ABSTRACT

An approach for ensuring the gaze of a user is directed towards a camera during a video conferencing session is described. A gaze detection platform determines a visual focal point of a user with respect to a display based on gaze tracking information, eye-tracking information, or a combination thereof, wherein the user is engaged in a video-based communication session presented on the display. The gaze detection platform further calculates an adjustment to the visual focal point to create a perceived visual focal point of the user with respect to a camera used by the user for the video-based communication session. The adjustment includes adjusting a use of an optical device, a change in a placement of content on the display, a physical movement of the camera, or a combination thereof.

20 Claims, 13 Drawing Sheets

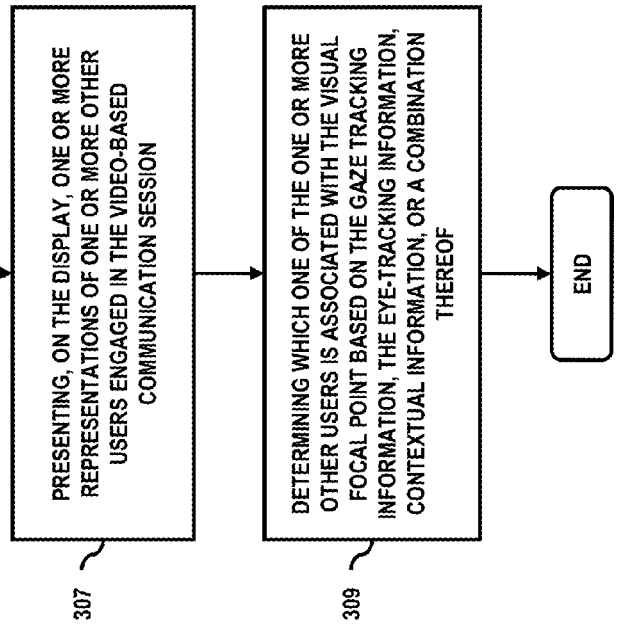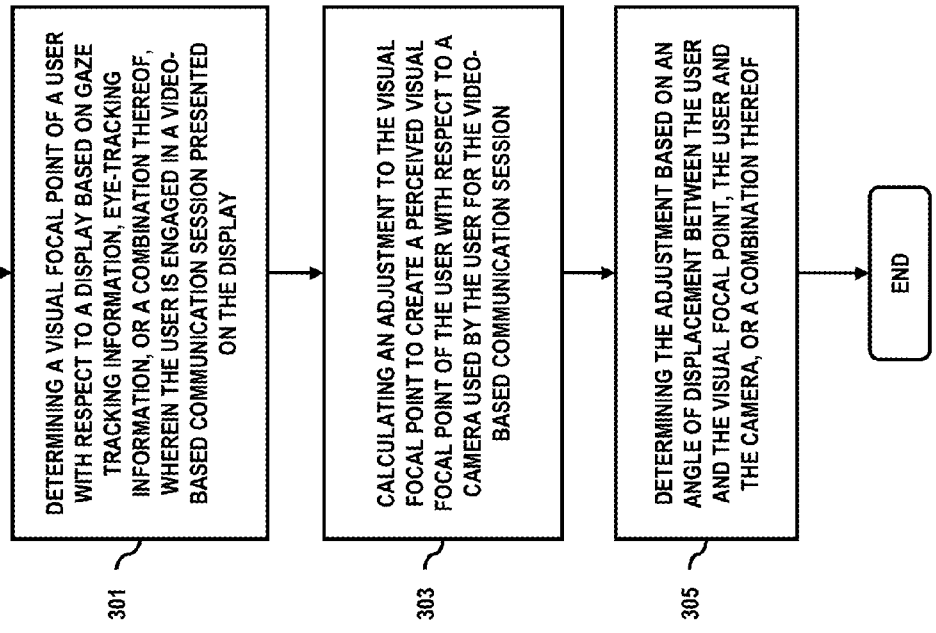

310

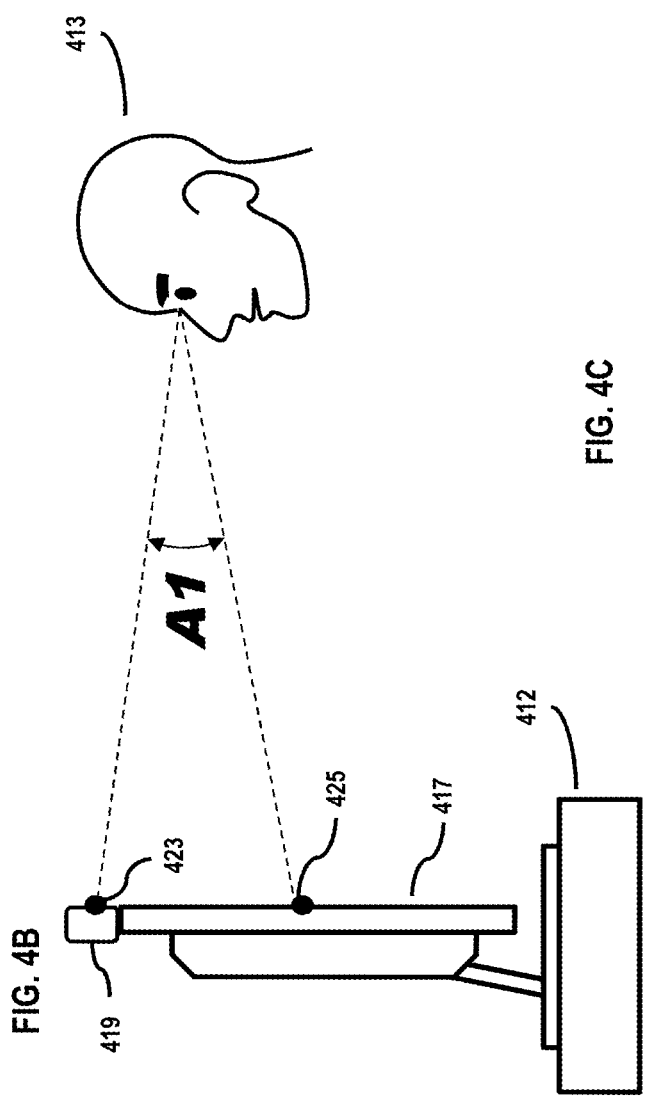
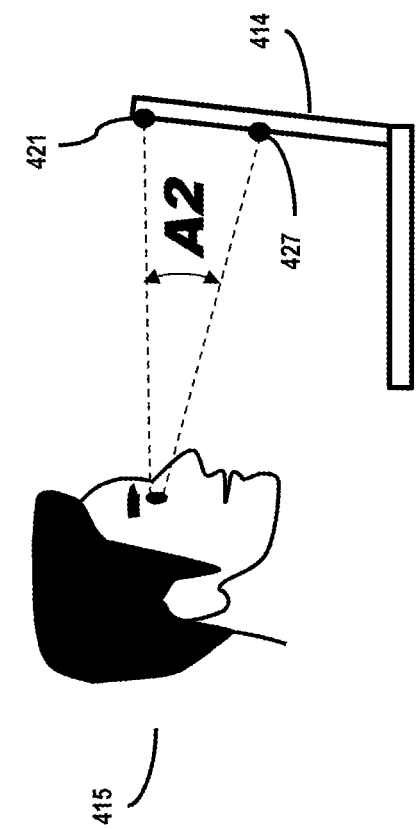
FIG. 4B
FIG. 4C

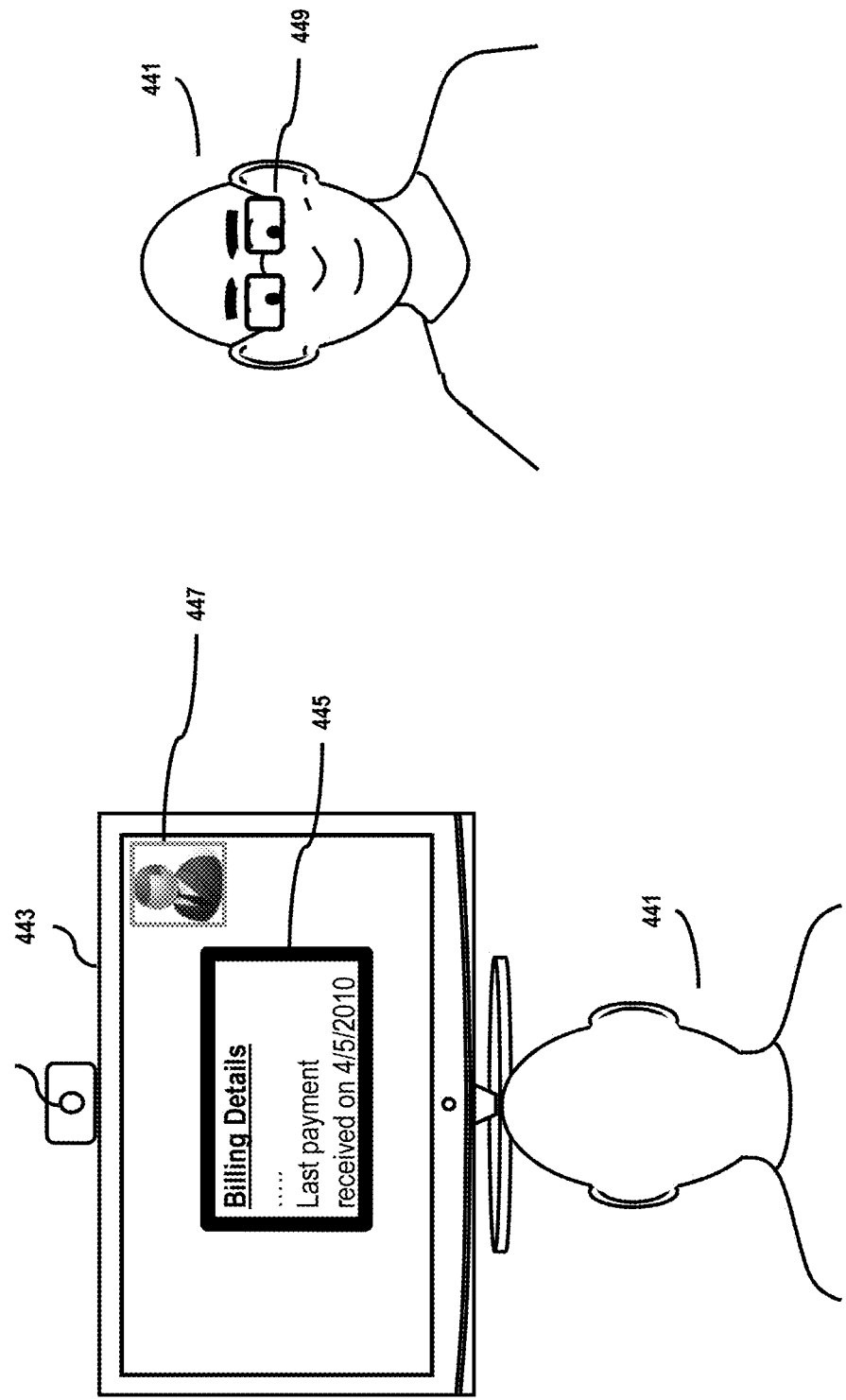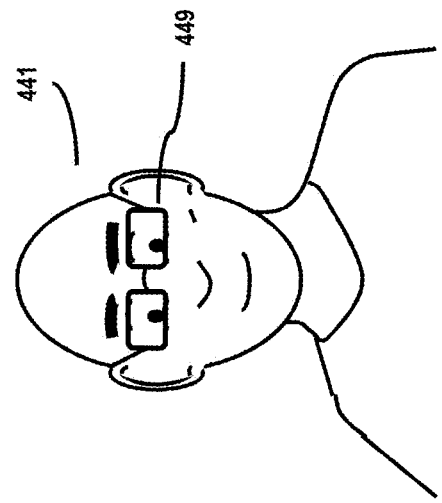

METHOD AND SYSTEM FOR PROVIDING GAZE-DIRECTED CORRECTION DURING A VIDEO CONFERENCING SESSION

BACKGROUND INFORMATION

Service providers are continually challenged to deliver value and convenience to consumers by providing compelling network services and advancing the underlying technologies. One area of interest has been enhancing the experience of users during video conferencing sessions. Typically, when users interact with each other during a session, each participant's face should be turned towards a video capture device (e.g., camera). The camera may be integrated in the display or mounted to the display or onto a stand, thus enabling the participant's face to be visible to other participant's. Unfortunately, the user's eyes are not always directed towards the camera. Rather, it is natural for participants to affix their gaze to an on screen document, a video panel showing the other participant they are interacting with, an email application, etc. The discrepancy between the focal point on the display and the position of the camera lens causes participants to appear as if they are avoiding direct eye contact.

Based on the foregoing, there is a need for ensuring the gaze of a user is directed towards the camera during a video conferencing session.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of a process for ensuring the gaze of a user is directed towards a camera during a video conferencing session, according to various embodiments;

FIGS. 4A-4I are diagrams of user interfaces utilized in the processes of FIGS. 3A-3C, according to various embodiments;

DESCRIPTION OF THE PREFERRED EMBODIMENT

An apparatus, method and software for ensuring the gaze of a user is directed towards a camera during a video conferencing session is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to video conferencing, it is contemplated that these embodiments have applicability to any data protocols, methodologies or systems for enabling social interaction and networking, video or image data exchange and processing, or the like.

Figure 1A:
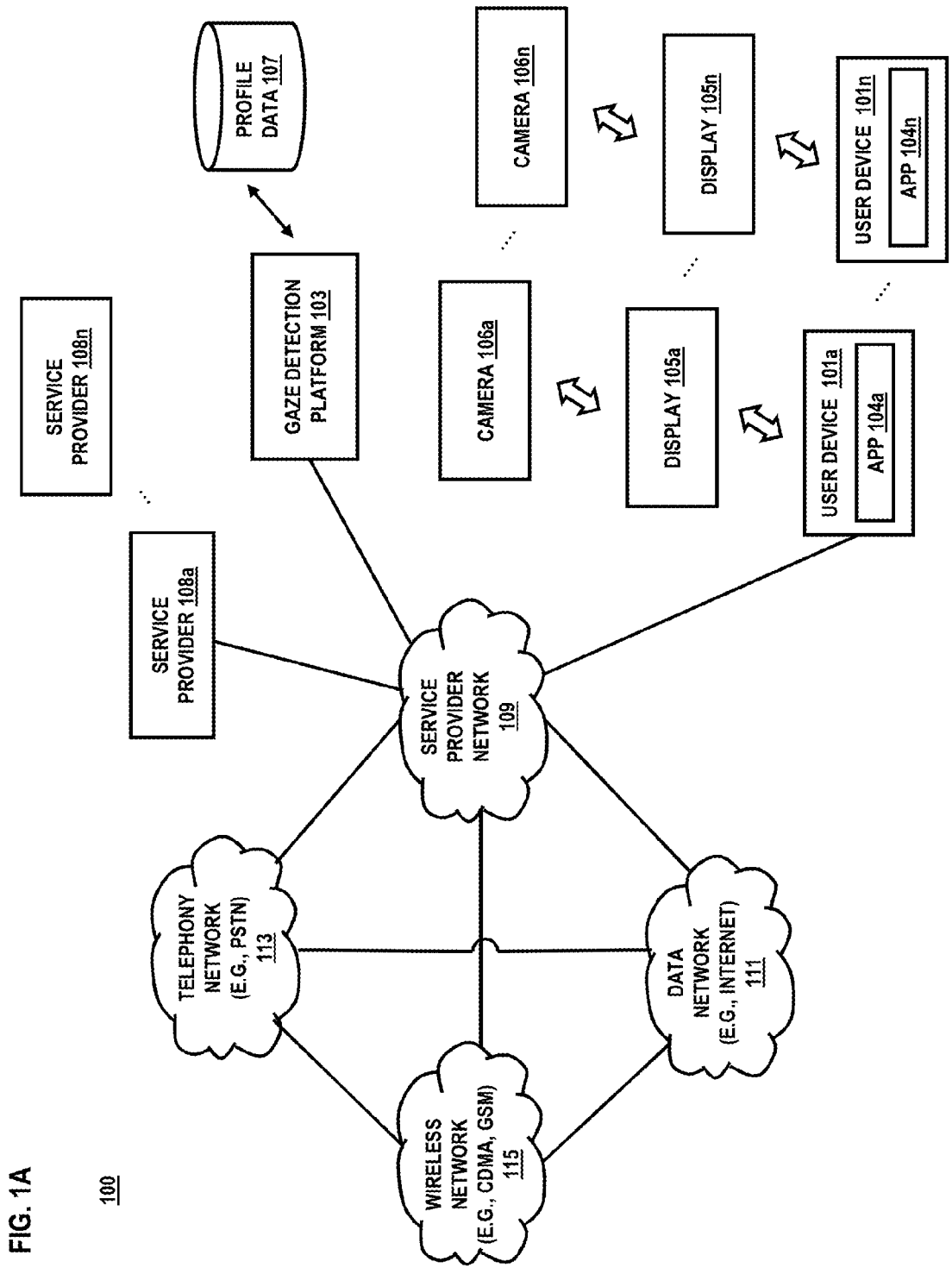
FIG. 1A is a diagram of a system for ensuring the gaze of a user is directed towards a camera during a video conferencing session, according to one embodiment.
Figure 1B:
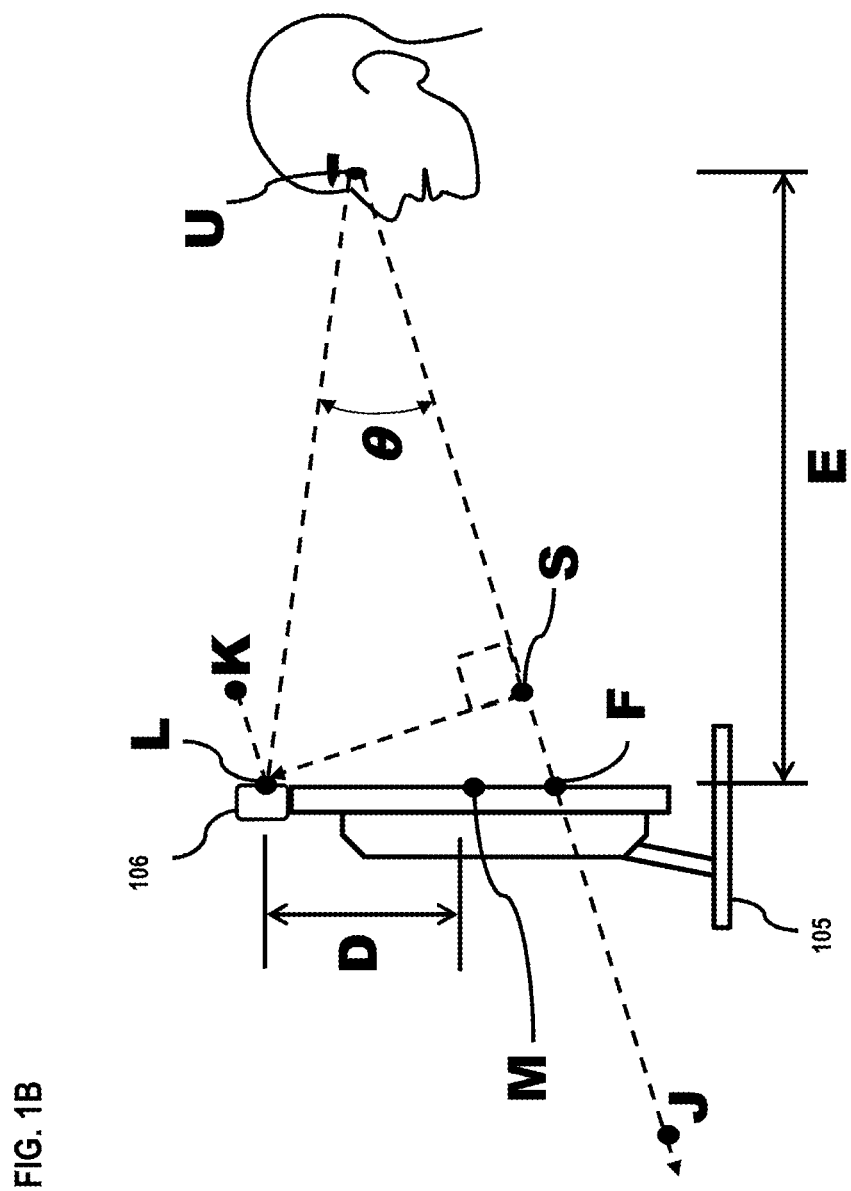
FIG. 1B is a diagram depicting a geometric relationship between a user of a user device that is a distance from a camera and a display, according to one embodiment.

FIG. 1 is a diagram of a system for ensuring the gaze of a user is directed towards a camera during a video conferencing session, according to one embodiment. For the purpose of explanation, system 100 is shown to include one or more user devices 101a-101n (e.g., mobile device, smart phone, wearable computer, netbook, laptop, set-top box, TV, or any communications enabled computing device), referred to herein collectively as user devices 101. The user devices 101 may be configured with various applications for performing different processing tasks, including a video conferencing application 104a-104n, referred to herein collectively as applications 104. By way of example, the applications 104 may access various services, including a video conferencing service as provided by service providers 108a-108n for enabling a communication session between the users.

The applications 104 and/or corresponding services may execute one or more application programming interfaces according to the operating systems of the user devices 101 for enabling the presentment of content to display device 105a-105n, referred to herein collectively as displays 105. By way of example, the displays 105 may render one or more graphics primitives for conveying messages, images, video and other content related to the communication session or other applications or tasks of the user device 101. In addition, the applications 104 and/or services may interact with camera devices 106a-106n, referred to herein collectively as cameras 106. The cameras may be configured to capture video or image data of users during a video conferencing session, which is then packaged and delivered to the conference participants per the service. It is noted that the displays 105 and cameras 106 may be integrated within the user device (e.g., built-in) or employed as peripheral components (e.g., wired or wireless).

As mentioned previously, when users interact with each other during a video conferencing session, each participant's face is turned towards a video capture device (e.g., camera). However, users are often faced with the choice of looking directly at the video camera or at a panel (e.g., a graphical window or content frame) for displaying video of another conference participant. The former makes the user appear as if they are looking directly at the video conference participant in an "eye-to-eye" fashion but limits the ability of the user to perform other tasks requiring the use of the display (e.g., seeing another participant's facial expressions, reviewing a document, reviewing web content, etc.). In the latter case, even though the user's gaze is directed towards the frame of the participant, it appears to the participant that the user is looking elsewhere. As a result, the level of intimacy or "eye-to-eye" engagement between the user and the participant is lost, albeit unintentionally. This problem arises due to the difference in the placement of the user's video camera with the line of sight of the user to the content they are focused on as presented to the display.

To address this issue, system 100 presents a gaze detection platform 103 that is configured to align the eyes of the user with the video camera as the user gazes at a focal point on the display. By way of example, the gaze detection platform 103 employs one or more processing techniques for compensating for an angle of displacement resulting from a difference between a first line of sight from the eyes of the user to a focal point on the display and a second line of sight from the eyes of the user to a lens of the camera. For the purpose of illustration herein, the angle of displacement corresponds to a degree or extent of physical and/or angular displacement between singular objects within view of the user, namely the display 105 or the camera 106. Consequently, from the perspective of the user, this discrepancy also corresponds to a degree or extent of tilt, angling, offset or "looking-away" of the eyes as the user focuses on the singular object. Hence, the platform 103 supports execution of one or more corrective actions or configuration actions for affecting the presentment of content at the display and/or by the user for achieving a perception of alignment of the first and second lines of sight as the user views the display 105.

In one embodiment, the corrective actions performed by the gaze correction platform 103 for affecting the presentment of content to the display may include one or more of: (1) identifying a current focal point of the user (e.g., what content they are currently looking at); (2) identifying an adapted focal point of the user for creating the perception of an aligning of the gaze of the user with the camera while they view content; (3) adapting a position, size or orientation of the content being viewed to correspond to the perceived focal point (e.g., adapting the onscreen position or orientation of what they are looking at); (4) initiating an automated adjusting of a position or orientation of the camera 106 to correspond to the visual focal point for aligning the gaze of the user with the camera while they view content; (5) modifying one or more inherent graphics and/or data processing characteristics of the display 105 for aligning the gaze of the user with the camera while the user views content.

In another embodiment, the gaze detection platform 103 may also support execution of a configuration action by a user, which may be performed as a means of tuning or training the platform 103 to perform the above described executions (e.g., actions 1-5). This may include, for example, automating a procedure for determining a use of an optical device (e.g., a power level of a prism device as measured in diopters), for use in adjusting and/or deviating the gaze of the user while they view content during the session. By way of example, the optical device may include prisms, mirrors, reflective surfaces, lighting components, etc. In the case of a prism device, this may include a prism based display cover, eyeglass lenses, or lens covers with prism correction qualities for displacing an image corresponding to a focal point of the user.

For the purpose of illustration, the exemplary embodiments herein will primarily pertain to the execution of actions 1-4 as described above. In addition, the exemplary embodiments herein will pertain to the configuration action as described. It is contemplated in future embodiments, however, that the executions of the gaze detection platform 103 may be utilized accordingly for affecting a placement of the camera or to affect a processing scheme of a graphics processor of the user device 101 accordingly. In the case of the former, for example, a display featuring adaptive image capture or mechanical movement of a camera may be instructed to be positioned to a current focal point of the user based on their gaze. In the case of the latter, for example, instructions may be presented to the graphics processor of the display 105 for affecting the first person perspective of the content at the display, the two or three-dimensional resolution, the tilt, etc., based on the determined optimal focal point of the user. Hence, the scope of the exemplary embodiments herein may pertain to any scheme or system for enabling a participant of a video conferencing session to perceive that the user is looking directly into the camera 106 regardless of what the user may actually be viewing at their display.

In one embodiment, the gaze detection platform 103 presents a web based configuration interface for use in tuning or training the platform 103 to operate in connection with the display 105 and the camera 106. By way of example, the interface may specify one or more instructions for the user to perform for enabling the tuning. This may include, for example, an instruction for the user to look into the camera from a normal distance away from the display 105. During this time, the platform 103 may determine a reference distance of the user to the display 105 and/or camera 106. In addition, the platform 103 may determine a reference distance from the camera to a mid-point of the display. As will be discussed further herein, the reference distances may be calculated for enabling the platform to determine the angle of displacement as well as account for changes in the focal point, gaze or distance of the user. It is noted that one or more image based measurement techniques may be employed.

Another instruction of the platform 103 may include specifying the user gaze at an icon presented to the display for a period of time (e.g., 5 seconds). During this time, the platform 103 may determine one or more facial characteristics of the user, identify one or more gaze characteristics of the user (e.g., a visual signature), or a combination thereof. Still further, the platform 103 may perform various procedures for calibrating the camera device, analyzing the display settings (e.g., resolution, graphics properties), determining lighting characteristics, etc. It is noted, in certain implementations, that the face detection, facial characteristic data, eye detection, eye movement data, or other data compiled for the user may be stored by the platform 103 as a profile per database 107 for immediate or subsequent use.

In one embodiment, the gaze detection platform 103 may further recommend a measure of a prism device, in diopters, to be used by the user for enabling the gaze of the user to appear as if it is directed towards the camera. This recommendation is generated as a result of the configuration procedure and corresponds to the angle of displacement, the relative distances of the user to the camera and display, etc. By way of example, the diopter measure may correspond to an amount of prism power suitable for causing shifting of the content corresponding to the perceived focal point as witnessed by the user, wherein the shift is an "upward" or "downward" displacement of the image. It is noted that a prism diopter is equal to one hundred times the tangent of the angle by which it displaces an image seen through the prism device. Hence, the recommended diopter measure corresponds to an additional amount of shifting (e.g., $\theta'$=arctan (diopter measure÷100)) of the content as perceived via the prism device for causing the eyes of the user to shift for overcoming the angle of displacement.

In one embodiment, the gaze detection platform 103 may determine a visual focal point of a user engaged in a video conferencing session with other participants. The focal point may correspond to a point and/or location within a viewable area of the display for presenting content. Hence, the focal point corresponds to a point in space upon which the gaze of the user is directed for the moment. The focal point also corresponds to the content presented at that point, thus constituting the current focus of the user. By way of example, the user may view one or more video panels for displaying video data of a participant (or a group thereof) engaged in the session. In this case, a separate video panel may be presented for each individual video data steam/network identifier/channel instance in common with a common session identifier for execution via a network (e.g., service provider network 109). Alternatively, the user may be focused on a specific participant within a group thereof as presented to a single panel, in which case, the focal point is determined as corresponding to the portion of the video content associated with this user.

Under this scenario, the portion and/or subset of an overall amount of content being presented to the user via the display 105 may also be the focal point.

As another example, the user may view a whiteboard, chat log, a document, a speaker identification frame, or other content that is presented with respect to the video conferencing session. Of note, the content presented will vary depending on the functions of the video conferencing application 104 or service and the associated graphical user interface features. Still further, in certain instances, content not related to the video conferencing application 104 may also be presented to the display 105 and viewed by the user during the session. For example, the user may talk with a first participant while also viewing a graphical user interface of another application, a desktop or file viewer of the user device 101, a music application, a movie application, a web browser, or the like. Regardless of the content, the platform 103 may detect which content and/or point of the display is currently in view by the user.

In one embodiment, the gaze detection platform 103 tracks the eye movements of users as a means determining the visual focal point. The platform 103 may execute one or more known facial recognition techniques, eye tracking and measurement techniques, or the like. For example, the platform 103 may utilize the camera 106 to perform video-based eye tracking, wherein the eyes of the user are recorded in response to visual stimulus. Per this approach, the center of the pupil may be observed in response to the emitting of infrared/near-infrared non-collimated light for identifying a corneal reflection (CR) of the user's eyes (pattern of light reflectivity in response to light). The vector between the pupil center and the corneal reflections may then be used to compute the focal point of the eyes or the gaze direction.

As another example, the platform 103 may determine a fixation period or gaze duration of the eyes versus the occurrence of saccades (limited duration). Per this scenario, when the eyes are directed towards and fixated upon a single point or immediate area encompassing said point beyond a predetermined threshold (e.g., 200 milliseconds), the platform 103 may interpret this point and/or area as the focal point. In addition, the fixation or saccade occurrences may be aggregated (over a short period) for determining a scan path depicting the eye movement patterns and/or tendencies of the user relative to the content presented. The scan path may be interpreted by the platform 103 for further validating a gaze of the user accordingly.

In one embodiment, the gaze detection platform 103 may also process contextual information regarding the user or other participants of the session to determine a current focal point of the user. By way of example, status information for indicating which user is the active speaker, the moderator, the presenter, a listener or the like during the active session may be identified. As another example, network identifier or channel information data may also be determined for identifying the active video panel. Once determined, the platform 103 may process the status information, network identifier information, channel information or the like in connection with the eye tracking and/or facial recognition data to identify or validate a visual focal point of the user.

As another example, the gaze detection platform 103 may utilize one or more known voice identification techniques for identifying an active speaker, which in combination with current eye movement or gaze of the user, may identify or validate the visual focal point. Still further, the platform 103 may track the current executions of the operating system, application 104 or service as engaged by the user during the session. This may include, for example, determining the central processing unit (CPU) usage, the types of processes performed, process durations, etc. This may also be tracked by the platform 103 in connection with any peripheral or embedded devices of the user device 101 such as a mouse, keyboard or gesture recognition device. Under this scenario, the platform 103 may identify a change in activity or use (e.g., a mouse scrolling action, a click action, a highlighting action, a typing action, a gesture) with respect to a specific application, a video panel, or a frame of content presented to the display during the session. This activity or usage data may then be referenced against the eye tracking and/or facial recognition data to identify or validate a visual focal point of the user.

In one embodiment, the gaze detection platform 103 determines an optimal placement of the content for creating a perceived visual focal point of the user that adjusts the user's gaze. For the purpose of illustration herein, reference is now made to FIG. 1B, which depicts a geometric relationship between a user of a user device 101 that is seated a distance from a camera 106 and a display 105. Optimized placement of the content may be based upon the determined angle of displacement θ resulting from a difference between a first line of sight (UF) from the eyes of the user to a focal point on the display and a second line of sight (UL) from the eyes of the user to a lens of the camera.

The gaze detection platform 103 may calculate the distances per any known image based measurement techniques in conjunction with the camera 106. This may include, for example, reference point based image modeling, deterministic modeling, sensor detection, or the like. Under this scenario, a reference distance E representing a distance from the user to the display and a distance D representing a distance from the center of the display to the camera 106 may be determined. As noted previously, the platform 103 may determine this distance during an initial tuning period of the platform 103. The reference distances may also be used for calculating the angle of displacement θ based on the geometric relationships between respective lines of sight (UL) and (UF). For example, in FIG. 1B, the angle of displacement θ may initially be calculated based on the reference distances D and E as follows:

$$\theta = \arctan(D \div E)$$

It is noted that the above calculation assumes the user, the display 105 and the camera 106 maintain a relative orientation to one another for forming a right triangle, i.e., wherein the line of sight from the user to the mid-point M or from the user to the camera 106 is a horizontal line. In other instances, the user may not be positioned with respect to the display 105 or camera 106 in this manner. For example, the user may be taller than the mid-point M of the display 106 but also not tall enough to look directly into the camera. Similarly, the user may be gazing at content at a visual focal point F. Under this scenario, various trigonometric functions based on a unit circle centered at point U may be employed, including:

For a chord of the circle, where θ is half of the subtended angle, sin (θ) is LS (half of the chord), wherein θ=arcsine (LS)

cos(θ) is the horizontal distance US, and versin (θ)=1−cos (θ) is SF tan(θ) is the length of the segment LJ of the tangent line through L, hence the word tangent for this function cot(θ) is another tangent segment LK.

Various other trigonometric calculations may be performed by the platform 103 accordingly depending on the determined focal point, the perceived focal point, the extent and/or degree of the angle of displacement to be overcome, etc. As noted previously, the measure of the diopter may also depend upon the above described geometric factors.

In one embodiment, the gaze detection platform 103 causes an adapting of the original placement of the content (e.g., coordinates/pixilation points) for presentment to the display as well as the size of the content for presentment to the display. The adaptation may be associated with a change of the focal point for the content; such that the current positioning or placement of the content differs from the adapted positioning or sizing of the content. For example, a video panel featuring video of a key speaker the user is focused on, corresponding to a point F at the display per FIG. 1B, may be adapted by the platform 103 such that this same content is shown at the center of the display point M. Furthermore, the content may be embellished (e.g., made to appear larger) than the other panels or larger than the panel did originally.

By way of example, the position of the content as adapted may be centered at a point between the lens of the camera, corresponding to a point L, and a mid-point M of the display 105. In the case where the camera 106 is positioned above the display 105, this corresponds to a placement of the content/focal point at or above the mid-point M of the display for causing a shifting of the line of sight of the user "upward" in the direction of the camera. Alternatively, in the case wherein the camera is positioned below the display 105, this corresponds to placement of the content/focal point at or below the mid-point M of the display for shifting the line of sight of the user "downward" in the direction of a line of sight of the user to the camera. In either case, it is noted that shifting of the content (upwards or downwards) and the extent thereof is based on an assumed vertical alignment of the lens of the camera with the mid-point of the display (e.g., camera sits a distance above the mid-point of the display). It is contemplated, in future embodiments, that alternate alignments of the display and camera may be accounted for, i.e., wherein the camera sits up to the left or right of the mid-point of the display 105 within a shared plane.

In one embodiment, the gazed detection platform 103 may subsequently adapt the perceived focal point of the user for affecting the placement of content to the display 105. This corresponds to a dynamic adjustment process, wherein the adjustment is triggered by a determined change in the distance from the user and the center point of the display. The adjustment may also be triggered by a perceived change in distance from the user and the camera. By way of example, if the user changes their seating or distance relative to the user device 101 from their original seat or distance as per the configuration process, this may be determined by the platform 103. The platform 103 may be configured to persistently monitor the relative locations, presence or distance of users during the session for determining changes during a communication session. In addition, a change in the dimensions of the display 105 or placement of the camera 106 may also be observed. Once a change is determined, the platform 103 then adapts the focal point, the placement of the portion of the content to the display, or a combination thereof accordingly. It is contemplated, in certain embodiments, that the platform 103 may generate one or more recommendations for the user to comply with, such as a change in the optical device (e.g., "Based on your current position, a prism device of 20 diopters is recommended"), a change in distance or orientation from the display or camera (e.g., "Move 1 foot closer to the display to maximize the effectiveness of your current prism device of 15 diopters.").

It is noted that the extent to which the content is adapted by the gaze detection platform 103 for presentment to the device—i.e., how much further above the mid-point of the display the content is placed—is also based on the diopter measure. Per the above described executions, the repositioning of the content plus the amount of displacement of the image to be perceived by the user via the prism device (e.g., θ') are suitable for overcoming the angle of displacement (enough to affect the perceived gaze of the user).

The above described executions of system 100 for enabling the gaze of the user to be directed towards the camera during a video conferencing session present several advantages. In one advantage, an optimal (perceived) focal point for placement (e.g., centering) of content may be determined based on factors including the user's gaze, eye movements, the active speaker and other factors. Per this execution, when the user employs a prism device, they are perceived by the participant's as looking directly into their eyes. As another advantage, the identity of the video panels presented during a video conferencing session and their position on the screen may be tracked and updated accordingly. In addition, specific video conference participant speakers may be identified based on status information, contextual information, or a combination thereof. As another advantage, the user's gaze direction, gaze duration and eye movements may be used to determine which video conference participant is the focal point for adapting of said focal point or repositioning of the camera. It is further noted, that the system 100, methodologies and principles presented herein may be further utilized in connection an automated or adaptive camera mechanism, an optical manipulation system, a graphics processing or manipulation scheme, or the like for further affecting the gaze of a user during a video conferencing session.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, wearable computer, Personal Digital Assistants (PDAs), smartphone or any combination thereof. It is also contemplated that the user devices 101a-101n can support any type of interface for supporting the presentment or exchanging of data. In addition, user devices 101a-101n may facilitate various input means for receiving and generating information, including touch screen capability, keyboard and keypad data entry, voice-based input mechanisms, gesture input mechanisms and the like. Any known and future implementations of user devices 101 are applicable.

By way of example, gaze detection platform 103 may be configured to communicate using one or more of networks 109, 111, 113 and 115. System 100 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G or 4G wireless broadband networks, mobile television networks, radio networks, etc.), terrestrial broadcasting networks, provider specific networks (e.g., fiber optic networks, cable networks, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect gaze detection platform 103 to various networks, such as service provider network 109. Although depicted in FIG. 1 as separate networks, communication networks 111, 113, and 115 may be completely or partially contained within service provider network 109. For example, service provider network 109 may include facilities to provide for transport of packet-based communications.

In certain embodiments, user devices 101a-101n, the gaze detection platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-115 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—i.e., near field communication (NFC), Bluetooth, ZigBee, infrared, WebRTC, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
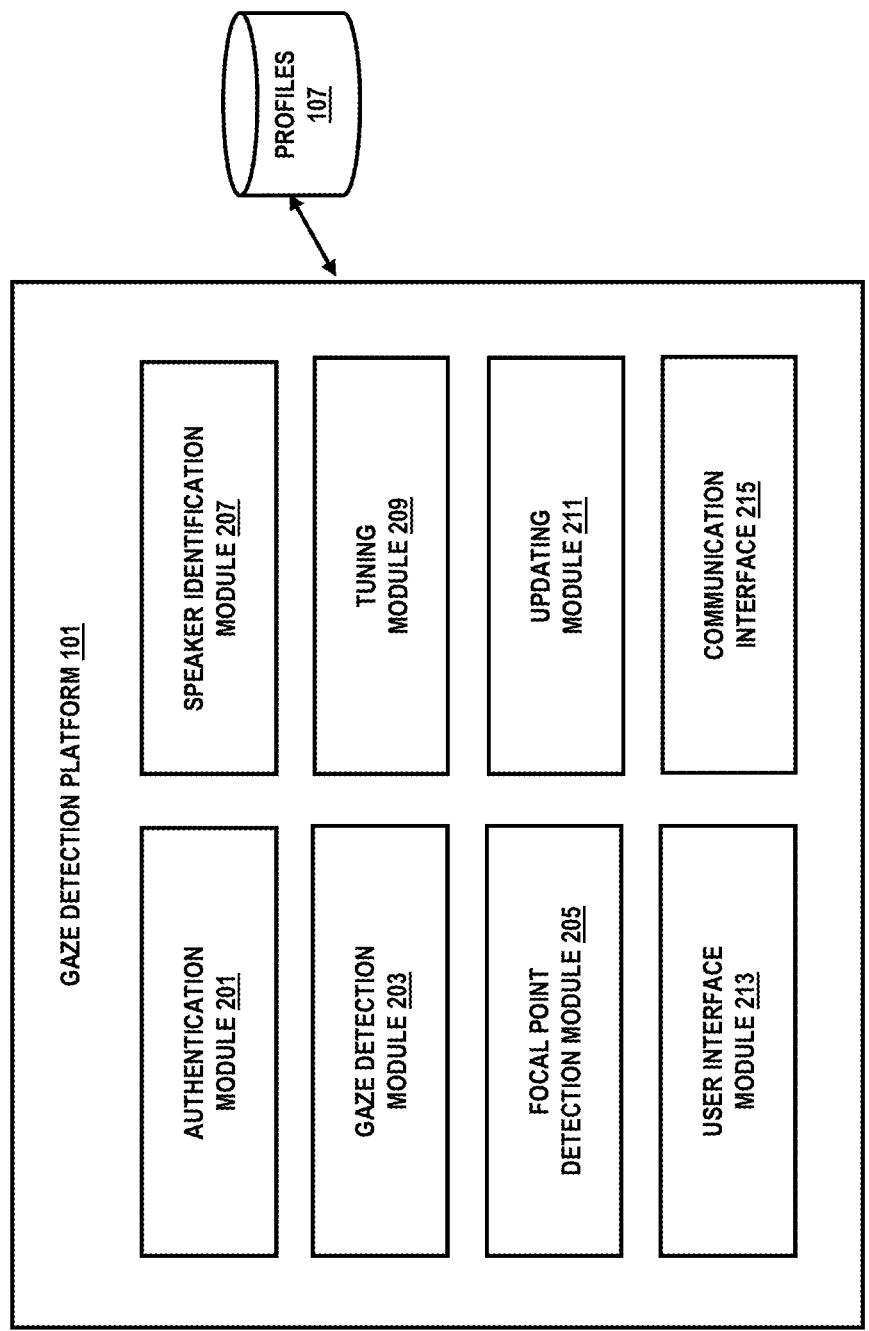
FIG. 2 is a diagram of a gaze detection platform, according to one embodiment.

FIG. 2 is a diagram of a gaze detection platform, according to one embodiment. The gaze detection platform 103 includes various executable modules for performing one or more computing, data processing and network based instructions that in combination provide a means of ensuring the gaze of a user is directed towards a camera during a video conferencing session. Such modules can be implemented in hardware, firmware, software, or a combination thereof. By way of example, the gaze detection platform 103 may include an authentication module 201, a gaze detection module 203, a focal point detection module 205, a speaker identification module 207, a tuning module 209, an updating module 211, a user interface module 213 and a communication interface 215.

In one embodiment, an authentication module 201 authenticates users and user devices 101a-101n for interaction with the gaze detection platform 103. By way of example, the authentication module 201 receives a request to subscribe to a video conferencing service or the platform 103 independently. The subscription process may include the generating of profile information for storage to a profile database 107. Under this scenario, the authentication module 201 may operate in connection with the gaze detection module 203 and focal point detection module 205 to determine one or more facial or eye characteristics of the user for impacting the ability to identify a current gaze or focal point of the user. This may correspond to an initial training period with respect to the user, which may then be stored as profile information accordingly for subsequent analysis of the users mannerisms, movements, eye scan patterns, gaze tendencies, etc., during performance of a video conferencing session.

The authentication module 201 may also operate in connection with the tuning module 209 for facilitating an initial configuration of the user's device 101, display 105 and camera device 106 accordingly for execution during a video conferencing session. The resulting configuration settings may include a determined standard distance of the user for interacting with the display or camera, a distance from the camera to a mid-point of the display and a recommended diopter measure. Additional settings may include resolution and/or graphics processing details regarding the display 105. The configuration settings are stored as profile information accordingly for supporting the adapting of said settings responsive to changes regarding the distance and/or placement of the user or camera, the size of the display (e.g., the screen dimensions), etc.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 213). Profile data 107 may be cross referenced as part of the login process. Additionally or alternatively, the login process may be performed through biometric mechanisms including facial, voice, fingerprint, or iris authentication and authorization. Alternatively, the login process may be performed through automated association of the profile information with an IP address, a carrier detection signal of a user device, mobile directory number (MDN), subscriber identity module (SIM) (e.g., of a SIM card), radio frequency identifier (RFID) tag or other identifier.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In one embodiment, the gaze detection module 203 and focal point determination module 205 perform various techniques, in conjunction with the camera device 106, for determining a user's gaze direction, gaze duration and eye movements. This may include, for example, tracking the eye movements, the scan path, the fixation of saccade occurrences, etc. In addition, the speaker identification module 207 may also interact with modules 203 and 205 for processing contextual information regarding the participants of the video conferencing session. This may include, for example, speaker status and identifier information, network identifier information, channel information (e.g., for identifying an active video panel) or the like. Still further, the speaker identification module 207 may perform one or more voice identification techniques for identifying an active speaker. Hence, the executions of the speaker identification module 207, when performed in connection with the eye tracking, gaze detection and/or facial recognition processes of modules 203 and 205, enables the platform 103 to identify or validate a visual focal point of the user. Modules 203 and 205 process the tracked data in order to determine which video conference participant, which panel, or other portion of content is the current focal point of the users for adapting of said focal point or repositioning of the camera.

In one embodiment, the tuning module 209 presents a web based configuration interface for use in tuning or training the platform 103 to operate in connection with the display 105 and the camera 106. By way of example, the interface may specify one or more instructions for the user to perform for enabling the tuning. This may include, for example, an instruction for the user to look into the camera from a normal distance away from the display 105. During this time, the platform 103 may determine a reference distance of the user to the display 105 and/or camera 106. In addition, the platform 103 may determine a reference distance from the camera to a mid-point of the display. Still further, the platform 103 may perform various procedures for calibrating the camera device, analyzing the display settings (e.g., resolution, graphics properties), determining lighting characteristics, etc. It is noted, in certain implementations, that the facial characteristic data, eye movement data, or other data compiled for the user may be stored by the platform 103 as a profile per database 107 for immediate or subsequent use.

In one embodiment, the updating module 211 initiates the adapting of a determined focal point of the user as well as the placement of the portion of the content to the display. By way of example, the updating module 211 may operate in connection with the user interface module 213 to adapt the position, size or orientation of the content being viewed to correspond to the perceived focal point (e.g., adapting the onscreen position or orientation of content the user is viewing based on the results of modules 203 and 205). In addition, the updating module 211 may also monitor a change in the dimensions of the display 105 or placement of the camera 106. Once a change is determined, the module 211 adapts the focal point, the placement of the portion of the content to the display, or a combination thereof accordingly. In addition, the module 211 may also generate one or more recommendations for the user to comply with based on updating or adaptation, including a recommended prisms diopter measure change, a recommended change in distance of the user, etc.

In one embodiment the user interface module 213 enables presentment of a graphical user interface for presenting content related to and during a video conferencing session. By way of example, the module 213 generates the interface in response to application programming interfaces (APIs) or other function calls corresponding to the video conferencing application 104 or a web portal application corresponding to a service per one or more providers 108. As such, the user interface module may enable the rendering of graphics primitives to the display 105. This includes, for example, presenting adapted content—i.e., a portion of content corresponding to a focal point of the user that is positioned and sized in accordance with the perceived focal point.

In one embodiment, a communication interface 215 enables formation of a session over a network 109 between the gaze detection platform 103 and the services of the service providers 108. By way of example, the communication interface 215 executes various protocols and data sharing techniques for enabling collaborative execution between a subscriber's user device 101 (e.g., mobile devices, laptops, smartphones, tablet computers, wearable computers, desktop computers) and the platform 103 over the network 109. It is noted that the communication interface 215 is also configured to support a browser session—i.e., the retrieval of content as referenced by a resource identifier during a specific period of time or usage of the browser. The browser session, such as executed by the tuning module 209 for enabling user performance of one or more configuration action, may enable one or more user feedback options, video display options, device detection options, or the like.

The above presented modules and components of the gaze detection platform 103 can be implemented in hardware, firmware, software, or a combination thereof. Though depicted as a separate entity in FIG. 1, it is contemplated that the platform 103 may be implemented for direct operation by respective user devices 101. As such, the platform 103 may generate direct signal inputs by way of the operating system of the user device 101 for interacting with the video conferencing application 104 and exchanging video content. In another embodiment, one or more of the modules 201-215 may be implemented for operation by respective user devices 101 as a platform 103, a hosted or cloud based solution, or combination thereof.

Figure 3C:
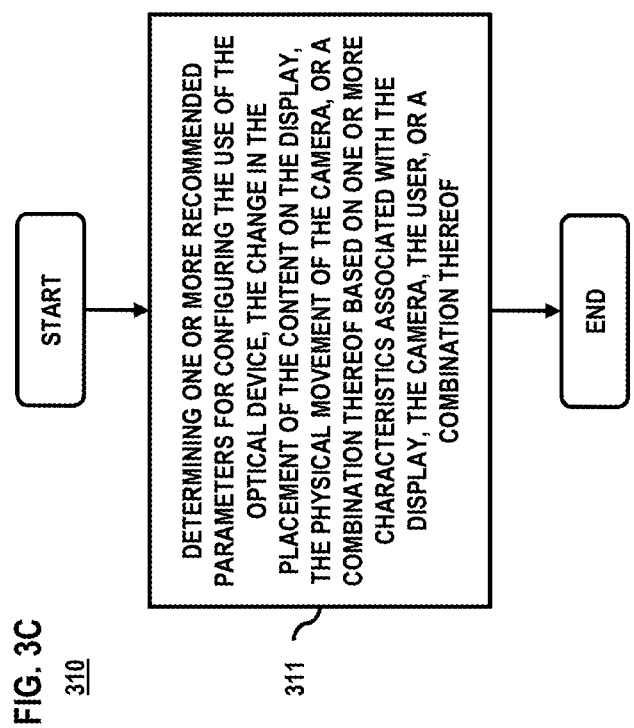
Figure 6:
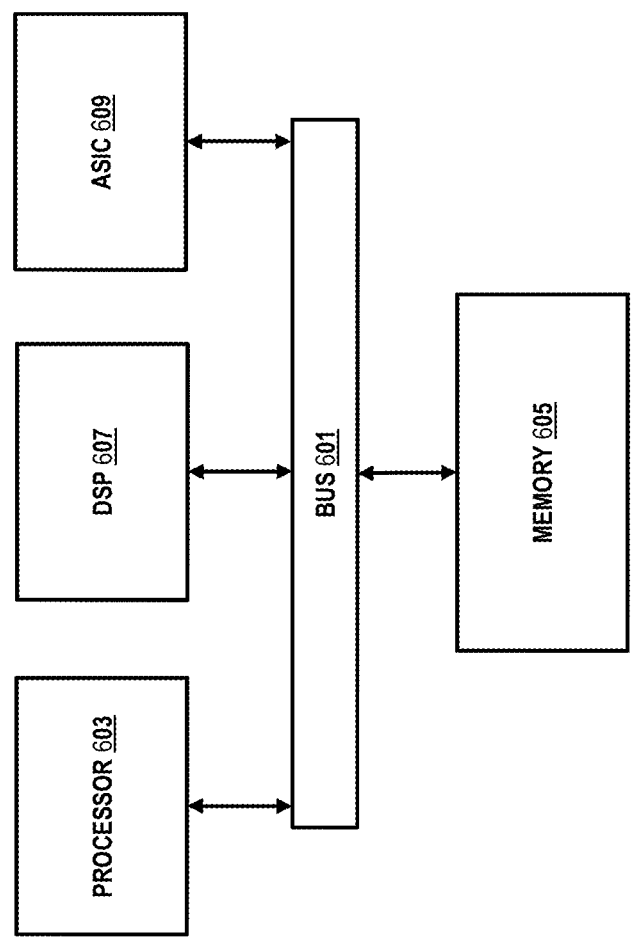
FIG. 6 is a diagram of a chip set that can be used to implement an embodiment of the invention.

FIGS. 3A-3C are flowcharts of a process for ensuring the gaze of a user is directed towards a camera during a video conferencing session, according to various embodiments. In one embodiment, the gaze detection platform 103 performs processes 300, 306, and 310 and is implemented in, for instance, a chip set including a processor and a memory as shown in FIG. 6.

In step 301 of process 300 (FIG. 3A), the gaze detection platform 103 determines a visual focal point of a user with respect to a display based on gaze tracking information, eye-tracking information, or a combination thereof, wherein the user is engaged in a video-based communication session presented on the display. As indicated previously, the visual focal point may correspond to a current line of sight of the user for viewing content at the display. In another step 303, the platform 103 calculates an adjustment to the visual focal point to create a perceived visual focal point of the user with respect to a camera used by the user for the video-based communication session. The perceived visual focal point, in contrast to the visual focal point, corresponds to a line of sight of the user for appearing to others as if the user is gazing directly into the camera. This perception may be achieved despite the actual content or focus of the user.

Per step 305, the platform 103 determines the adjustment based on an angle of displacement between the user and the visual focal point, the user and the camera, or a combination thereof. As noted previously, the angle of displacement results from a difference between a first line of sight from the eyes of the user to a focal point on the display and a second line of sight from the eyes of the user to a lens of the camera. Also, of note, the adjustment includes adjusting a use of an optical device, a change in a placement of content on the display, a physical movement of the camera, or a combination thereof. The optical device may include a prism device including a lens, a lens cover, or a combination thereof associated with a pair of eyeglasses, a display cover, or a combination thereof.

In step 307 of process 306 (FIG. 3B), the gaze detection platform 103 presents, on the display, one or more representations of one or more other users engaged in the video-based communication session. In another step 309, the platform 103 determines which one of the one or more other users is associated with the visual focal point based on the gaze tracking information, the eye-tracking information, contextual information, or a combination thereof. The contextual information includes a visual signature, a facial characteristic, an identifier, a session identifier, a network location, or a combination thereof associated with the user, the one or more other users, the content on the display, or combination thereof.

In step 311 of process 310 (FIG. 3C), the gaze detection platform 103 determines one or more recommended parameters for configuring the use of the optical device, the change in the placement of the content on the display, the physical movement of the camera, or a combination thereof based on one or more characteristics associated with the display, the camera, the user, or a combination thereof. As noted previously, this may include determining a geometric relationship between the user, the camera, the display, or a combination thereof. In addition, in the case where the optical device is a prism device, the measure may include determining a diopter measure. The use of the optical device results in implementation of the perceived visual focal point by causing a shifting of the eyes of the user with respect to the camera.

FIGS. 4A-4I are diagrams of user interfaces utilized in the processes of FIGS. 3A-3C, according to various embodiments. For the purpose of illustration, the diagrams are described with respect to an exemplary use case of a user interacting with other participants during a video conferencing session. Per these examples, the user and some of the participants employ devices that are configured with a display and camera for interacting with the gaze detection platform 103.

Figure 4A:
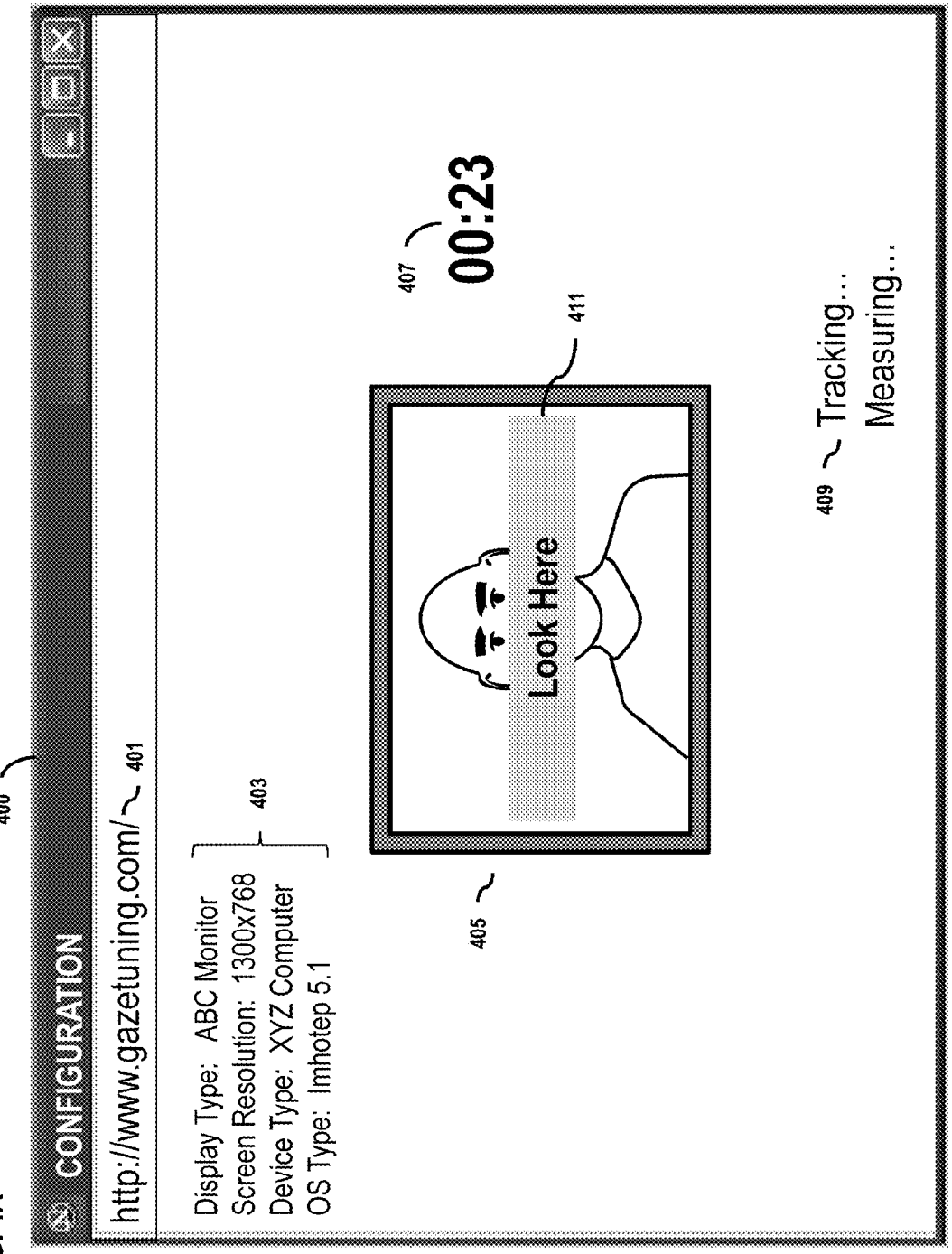

In FIG. 4A, the user of a device accesses a configuration interface of the gaze detection platform 103. By way of example, the user accesses the interface via a browser application 400 by entering a specified uniform resource locator (URL). Alternatively, the configuration interface may be enabled as an application or service for execution via the user device. This may include, for example, a standalone execution or integrated execution with the video conferencing application of the device. It is noted that any means for enabling the initial and subsequent configuration—i.e., tuning and/or training—of the device for use in connection with the platform 103 may be utilized.

Once the web page is loaded, the platform 103 may presents various content to the user. This may include, for example, one or more instructions for analyzing the imaging characteristics of the camera associated with the device, ambient lighting conditions of the room the user is in, etc. Other instructions may include those to be performed by the user for enabling the platform 103 to determine the video capture quality along with various distance measurements. For example, the platform 103 may present a frame 405 for presenting an image of the user as they look into the camera or as they look at a designated focal point, i.e., a "Look Here" message 411. As the user performs this action, the platform 103 tracks the relative movement patterns and eye dimensions of the user. In addition, the platform 103 may determine the gaze characteristics of the user, their facial characteristics and the like. Still further, the platform 103 may determine the relative distance from the user (their face) to the camera as well as a distance from the mid-point of the monitor to the camera. Under this scenario, the platform 103 presents a status message 409 for indicating the current activities being performed as the user performs the requested action.

In FIGS. 4B and 4C, different users are shown as they interact with their user devices during the configuration phase. In this example, a first user 413 utilizes a desktop computer 412 featuring a peripherally connected display (e.g., monitor) 417, camera 419 and keyboard (not shown). The lens of the camera corresponds to a point 423 while a mid-point of the display corresponds to a point 425. In contrast, a second user 415 utilizes a laptop 414 featuring an integrated camera with a lens corresponding to a point 421. In addition, the laptop features an internal display, wherein the mid-point of the display corresponds to a point 427.

Each user 413 and 415 interacts with the gaze detection platform 103 for improving their perceived gaze during a video conferencing session. During the configuration process, the users may also interact in tandem for performing the video conferencing session. This corresponds to a mutual configuration procedure, wherein one or more characteristics of the respective users or user devices that are to be involved in the session may be accounted for. By way of example, the users may both access the configuration interface 400 from their respective devices and remote locations. As the users are acquainted and know they will be engaged in a video conferencing session at a later time, they validate each other for mutual configuration interaction.

Instructions are presented to both users 413 and 415 alike for enabling the platform 103 to determine characteristics of the users and/or their respective devices 412 and 414. In the case where the lighting conditions for the first user 413 are determined to be poor, the platform 103 generates an instruction for the user 413 to increase the amount of light in their environment. It is noted that the instruction regarding the lighting conditions may be analyzed based on sensor information as acquired at the device 412 of the user 413. Alternatively, the platform 103 may observe a poor quality of the video data presented to device 414. As such, feedback information regarding the other user 415 may inform the action required by the first user 413.

In the case of the first and second users 413 and 415 respectively, they each have different angles of displacement A1 and A2 based on the relative distances they are from the camera and/or displays. Also, the distance from the midpoints 425 and 427 to the cameras at points 423 and 421 differ. Based on this feedback from both devices 412 and 414 respectively, the platform 103 then generates an instruction for the second user to alter their distance (e.g., move away) from the device 414 as a means of increasing the visibility of the user 415 at the display of the first user 413. Still further, the platform 103 generates different diopter measures for each user based on their angles of displacement A1 and A2.

It is noted that additional instructions may be requested of the users during the tuning process for initiating a mutual configuration. In addition, the profiles for the respective users 413 and 415 may be associated with one another for subsequent recall during a video conferencing session. By referencing the profiles in this manner, subsequent changes made by a first user may be automatically performed or required to be performed by the user.

Figure 4D:
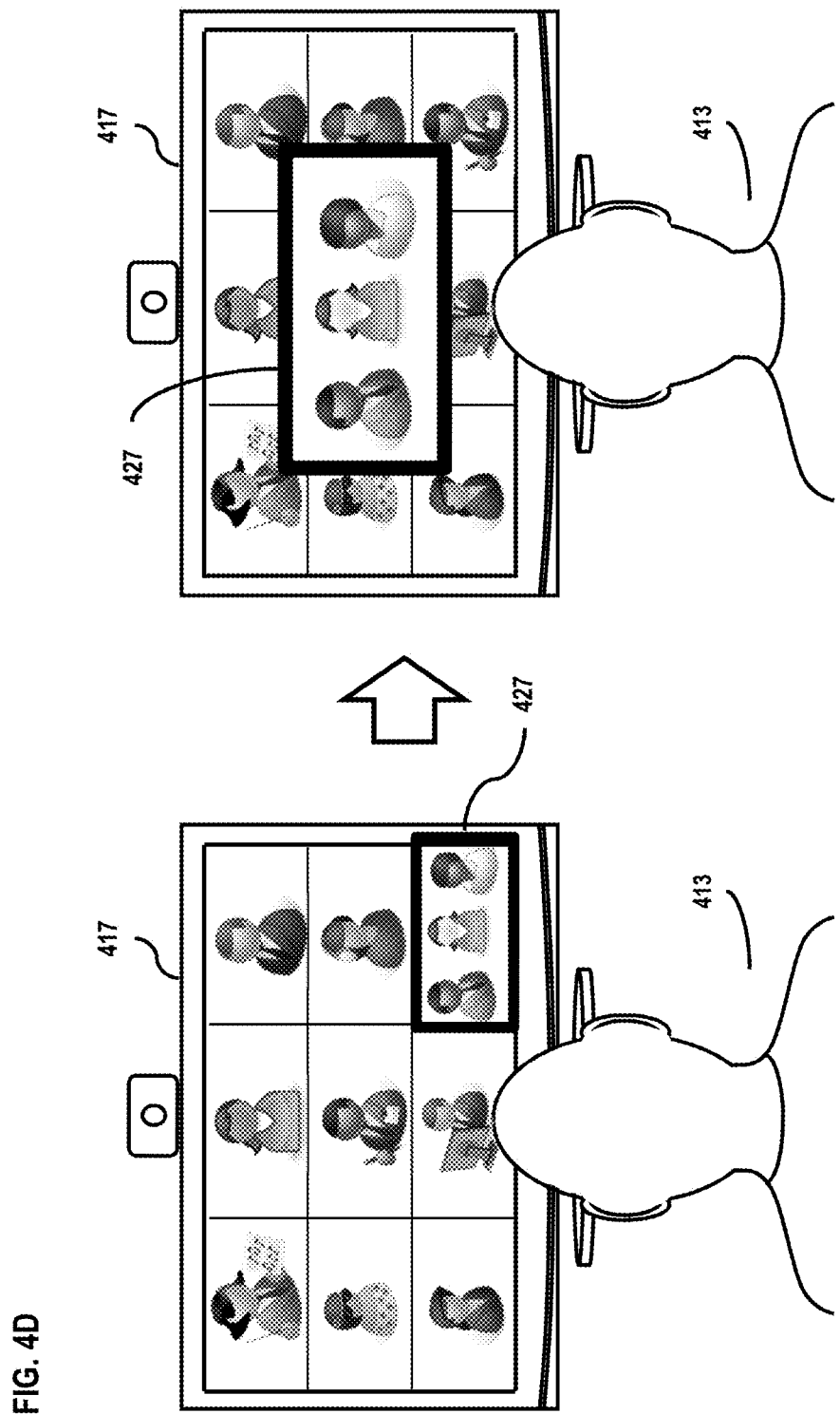

In FIG. 4D, having performed the configuration and received feedback regarding a prism device, the user 413 engages in a video conferencing session. Under this scenario, the session features nine different streams representing nine different remote participant session identifiers. Some of the panels feature multiple participants, such as a panel 427 that is also the current focus of the user 413. As such, the platform 103 tracks the movement of the user's eyes as well as the duration of the gaze to determine the current focal point of the user as video panel 427. As a result of this observation, the platform 103 then initiates an adapted sizing and positioning of the content corresponding to this focal point—i.e., video panel 427—such that it is prominently featured in the middle of the display. This causes the original video panel at the display to be placed where panel 427 was, keeping the focus of the user on the content in the middle as the new focal point.

Figure 4F:
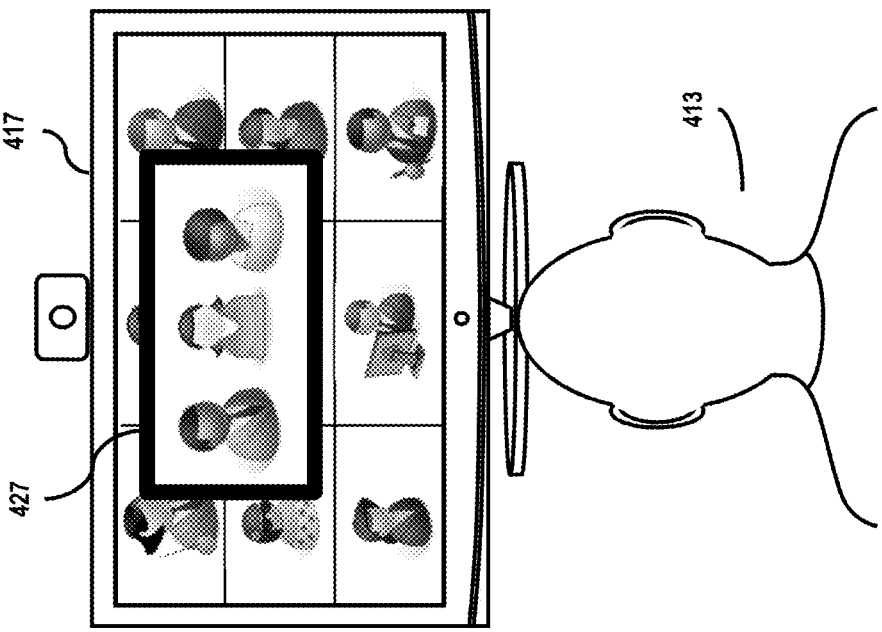
Figure 4E:
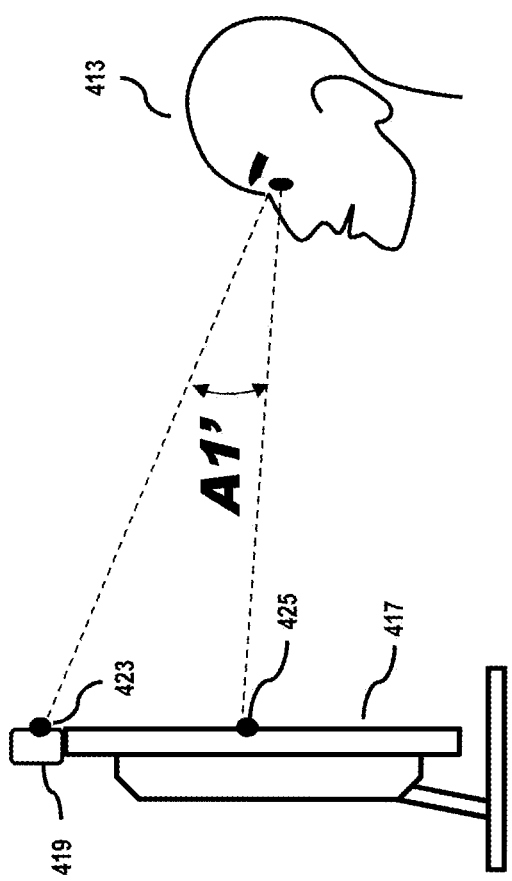

In FIGS. 4E and 4F, the user 413 leans back in their chair during the video conference, such as to ponder a comment made by one of the participants shown in video panel 427. This results in an adapting of their distance from the lens of the camera and ultimately their angle of reference to the focal point. As such, the resulting angle of displacement changes from a value A1 to A1'. In addition, their eyes are caused to move from the initial orientation as the user maintains eye contact with the focal point, i.e., the video panel 427. In response to detection of these conditions, the gaze detection platform 103 initiates a subsequent adapting of the focal point. In this case, the middle video panel 427 is shifted upwards slightly to compensate for the adaptation in the movement of the user. The upward shifting of the highlighted content corresponding to the newly adopted focal point is based on a differential in the angle of reference, the distance of the user, or a combination thereof. In addition, current information regarding the current diopter level of a prism device of the user 413 may also be used by the platform 103 inform the extent of shifting of the panel 427.

In FIG. 4G, the user 441 is a customer service representative for a company. In this example, a customer initiates a video conference session with the user to inquire about an error regarding the customer's payment history. As a result, a session is established (upon acceptance of the conference request by the user 441) and a video panel 447 for the customer is presented to the display 443 of the user (customer service representative 441). Under this scenario, the customer representative employs a pair of glasses 449 featuring prism devices (e.g., Fresnel prisms that adjust the gaze by 15 diopters) affixed thereon, as shown in FIG. 4H. The intensity of the prism devices is based on the calculation performed by the platform 103 during the configuration process (e.g., 15 diopters).

Due to the nature of the call, the customer service representative retrieves and reviews the customer's billing details/record 445. In this case, the gaze detection platform 103 detects the focal point of the user as corresponding to the billing details content 445 and places this content in the middle of the display 443. This is in opposition to the video panel 447 being displayed in the middle, as is typically the case. Consequently, the gaze of the customer service representative 441 is as shown in FIG. 4H, wherein the representative's eyes are directed downward towards the billing details content 445 featured in the middle.

Figure 4I:
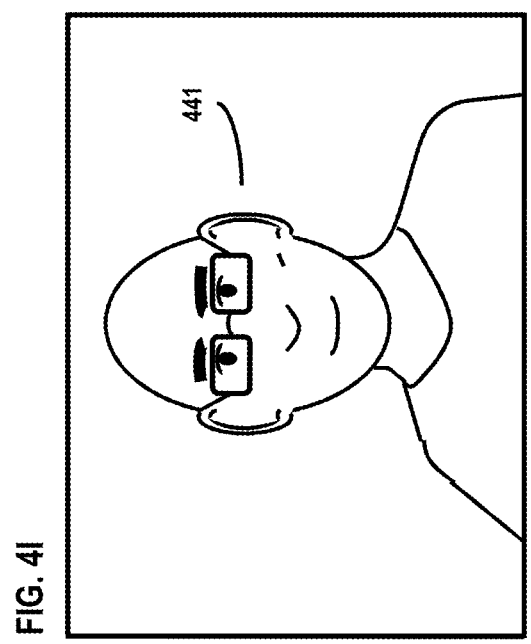

Having calculated the optimal focal point and reoriented the content accordingly for perceived alignment of the gaze with the camera lens 451, the gaze of the representative appears to the customer (e.g., via a video panel at their device) as shown in FIG. 4I. The gaze appears to the customer as if the customer service representative is looking directly into the camera or "eye-to-eye" even though the representative is actually looking at the billing details 445. The diopters affixed to the lenses of the glasses 449 cause the eyes of the representative to shift upward, the extent of which compensates for the determined angle of displacement. It is noted also that the billing details content 445 may also be adjusted (e.g., upward) for further compensating for the angle of displacement in conjunction with the prism device.

While not shown herein, it is further contemplated in future embodiments that the highlighted panel may also be adjusted dynamically as the user offsets the orientation or angle of their head adjacent to the plane of the display. So for example, in the case where the representative leans right and places their head into their cupped right hand while resting their elbow on the table, the location of the content corresponding to the focal point may also be adjusted. Regardless of the adaptation, the platform 103 maintains optimal positioning of the content for compensating for any lack of alignment between the eyes of a user and the camera lens.

The processes described herein for ensuring the gaze of a user is directed towards a camera during a video conferencing session may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
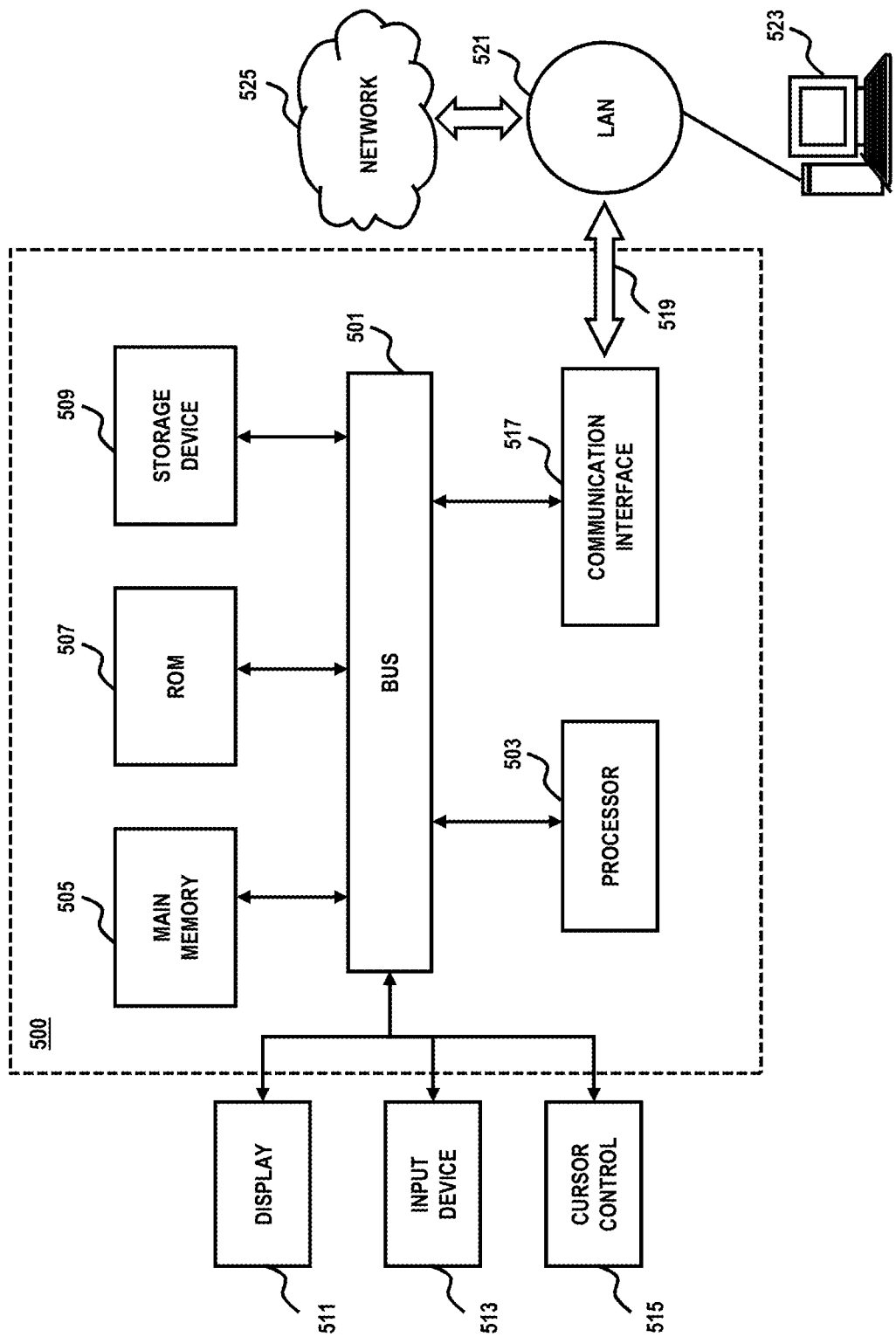
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, a microphone, a camera, a gesture recognizer, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to ensure the gaze of a user is directed towards a camera during a video conferencing session as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of ensuring the gaze of a user is directed towards a camera during a video conferencing session.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to ensure the gaze of a user is directed towards a camera during a video conferencing session. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
presenting, on a display, a plurality of display areas, each display area corresponding to a respective stream of a video-based communication session;
determining a visual focal point of a user with respect to the display based on gaze tracking information, eye-tracking information, or a combination thereof, wherein the user is engaged in the video-based communication session presented on the display;
identifying a particular display area, of the plurality of display areas, that corresponds to the determined visual focal point; and
calculating an adjustment to the visual focal point to create a perceived visual focal point of the user with respect to a camera used by the user for the video-based communication session,
wherein the adjustment includes a change in a placement of content on the display, based on the perceived visual focal point,
the change in the placement of content including:
modifying a manner in which the particular display area is presented on the display, with respect to one or more other display areas, of the plurality of display areas.

2. A method of claim 1, wherein the adjustment results in an appearance of a more direct gaze of the user into the camera than with the visual focal point.

3. A method of claim 1, further comprising:
determining the adjustment based on an angle of displacement between the user and the visual focal point, the user and the camera, or a combination thereof.

4. A method of claim 1, wherein the adjustment further includes:
an adjustment of an optical device worn by the user.

5. A method of claim 1, further comprising:
determining one or more recommended parameters for configuring the change in the placement of the content on the display based on one or more characteristics associated with the display, the camera, the user, or a combination thereof.

6. A method of claim 5, wherein the one or more recommended parameters are further based on a geometric relationship among the user, the camera, the display, or a combination thereof.

7. A method of claim 4, wherein the optical device includes a prism device including a lens, a lens cover, or a combination thereof, associated with a pair of eyeglasses, a display cover, or a combination thereof.

8. An apparatus comprising a processor configured to:
present, on a display, a plurality of display areas, each display area corresponding to a respective stream of a video-based communication session;
determine a visual focal point of a user with respect to the display based on gaze tracking information, eye-tracking information, or a combination thereof, wherein the user is engaged in the video-based communication session presented on the display;
identify a particular display area, of the plurality of display areas, that corresponds to the determined visual focal point; and
calculate an adjustment to the visual focal point to create a perceived visual focal point of the user with respect to a camera used by the user for the video-based communication session,
wherein the adjustment includes a change in a placement of content on the display, based on the perceived visual focal point,
the change in the placement of content including:
a modification of a manner in which the particular display area is presented on the display, with respect to one or more other display areas, of the plurality of display areas.

9. An apparatus of claim 8, wherein the adjustment results in an appearance of a more direct gaze of the user into the camera than with the visual focal point.

10. An apparatus of claim 8, wherein the processor is further configured to:
determine the adjustment based on an angle of displacement between the user and the visual focal point, the user and the camera, or a combination thereof.

11. An apparatus of claim 8, wherein the adjustment further includes:
an adjustment of an optical device worn by the user.

12. An apparatus of claim 8, wherein the processor is further configured to:
determine one or more recommended parameters for configuring the change in the placement of the content on the display based on one or more characteristics associated with the display, the camera, the user, or a combination thereof.

13. An apparatus of claim 11, wherein the optical device includes a prism device including a lens, a lens cover, or a combination thereof, associated with a pair of eyeglasses, a display cover, or a combination thereof.

14. A system comprising:
a display configured to present a video-based communication session;
a camera configured for use by a user engaged in the video-based communication session; and
a platform configured to determine a visual focal point of the user with respect to the display based on gaze tracking information, eye-tracking information, or a combination thereof; and to calculate an adjustment to the visual focal point to create a perceived visual focal point of the user with respect to the camera,
wherein the adjustment includes adjusting a component of an optical device worn by the user.

15. A system of claim 14, wherein the adjustment to create the perceived visual focal point results in an appearance of a more direct gaze of the user into the camera than with the visual focal point.

16. A system of claim 14, wherein the platform is further configured to determine the adjustment based on angle of displacement between the user and the visual focal point, the user and the camera, or a combination thereof.

17. A method of claim 1, wherein the modifying includes:
increasing a size of the particular display area with respect to a size of the one or more other display areas.

18. A method of claim 1, wherein the modifying includes:
moving the particular display area, from a first position on the display to a second position on the display, without moving the one or more other display areas.

19. An apparatus of claim 8, wherein when modifying the manner in which the particular display area is presented, the processor is configured to:
increase a size of the particular display area with respect to a size of the one or more other display areas.

20. An apparatus of claim 8, wherein when modifying the manner in which the particular display area is presented, the processor is configured to:
move the particular display area, from a first position on the display to a second position on the display, without moving the one or more other display areas.

* * * * *